E. S. MOORE.
INCUBATOR.
APPLICATION FILED SEPT. 15, 1911.
1,033,031.
Patented July 16, 1912.
2 SHEETS—SHEET 1.
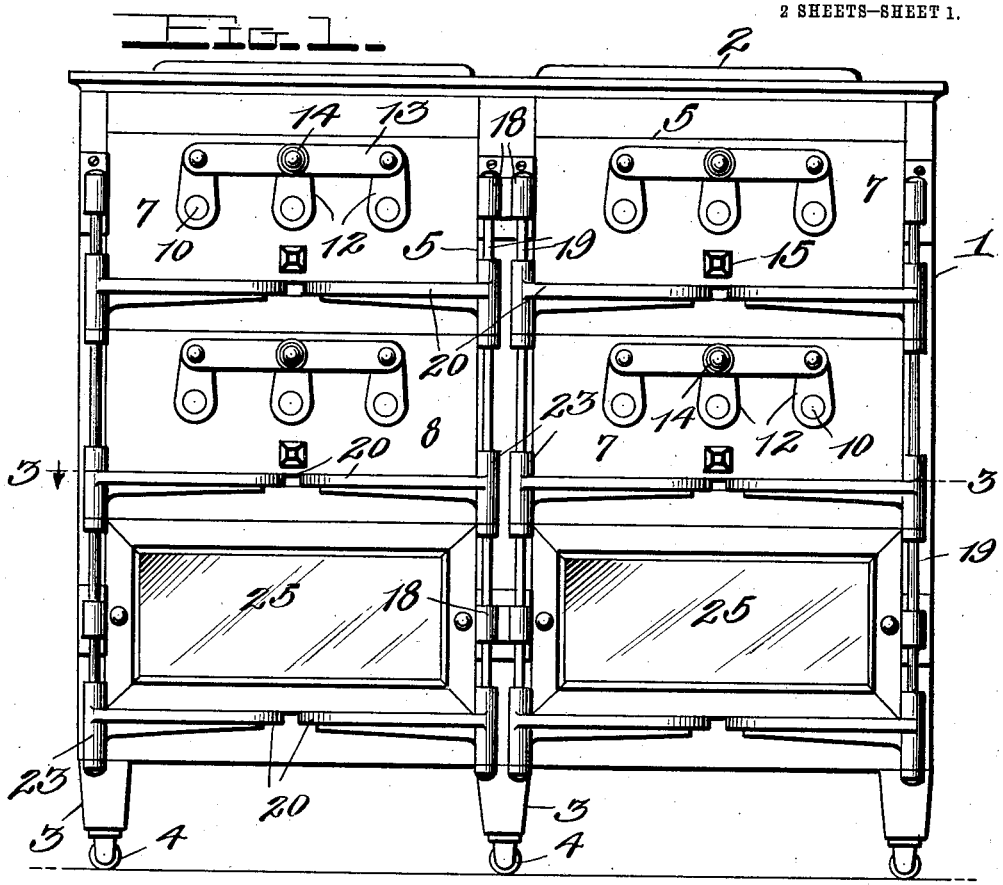
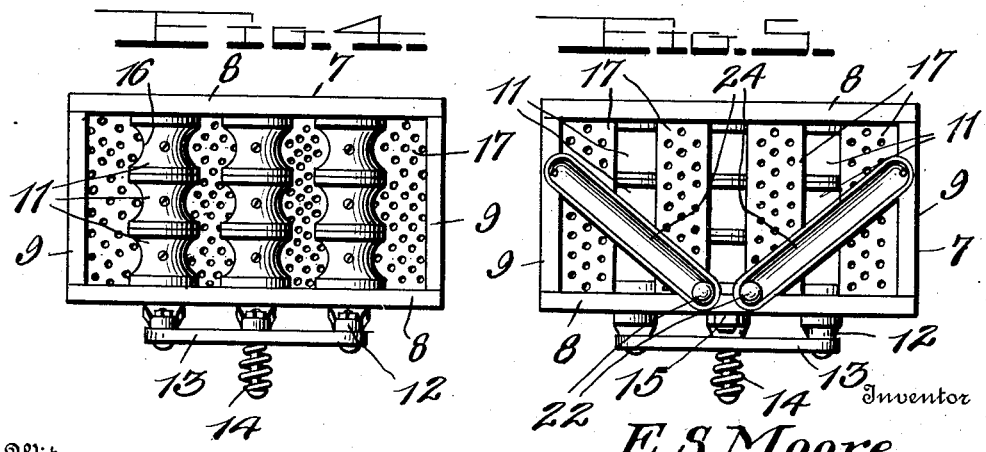
Witnesses
Chas. L. Griesbauer.
L. H. Ellis.
Inventor
E. S. Moore,
By Watson E. Coleman.
Attorney E. S. MOORE.
INCUBATOR.
APPLICATION FILED SEPT. 15, 1911.
1,033,031.
Patented July 16, 1912.
2 SHEETS—SHEET 2.
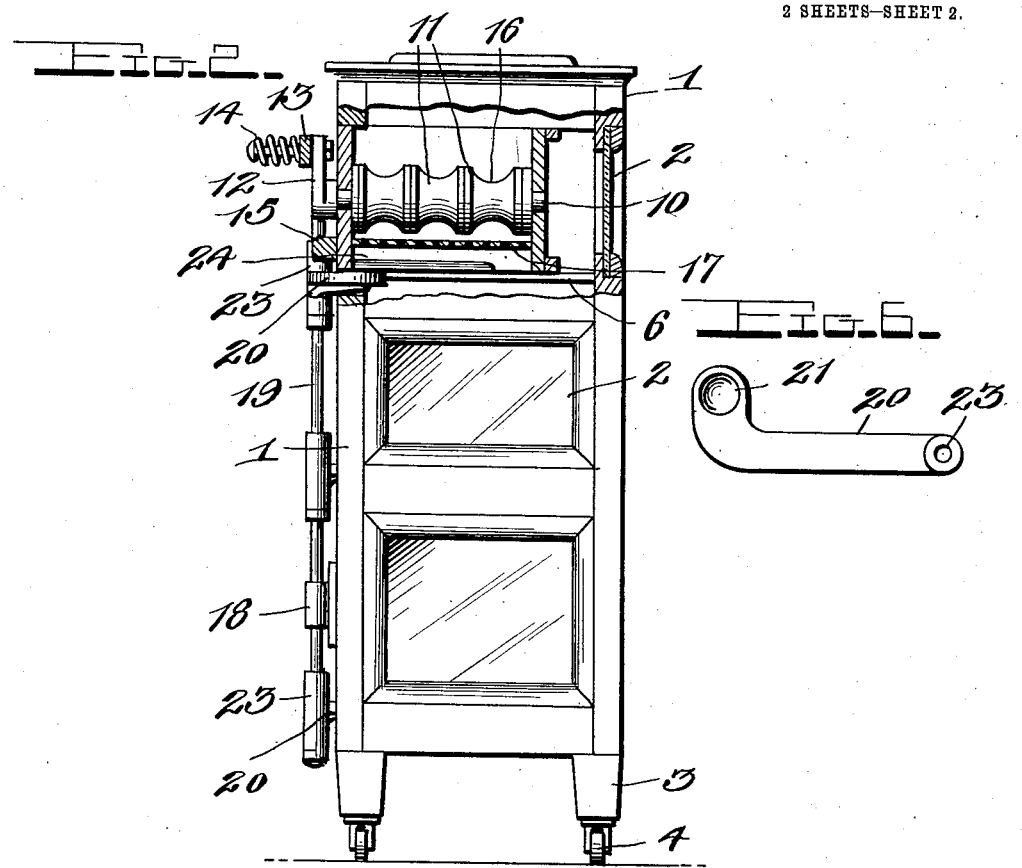
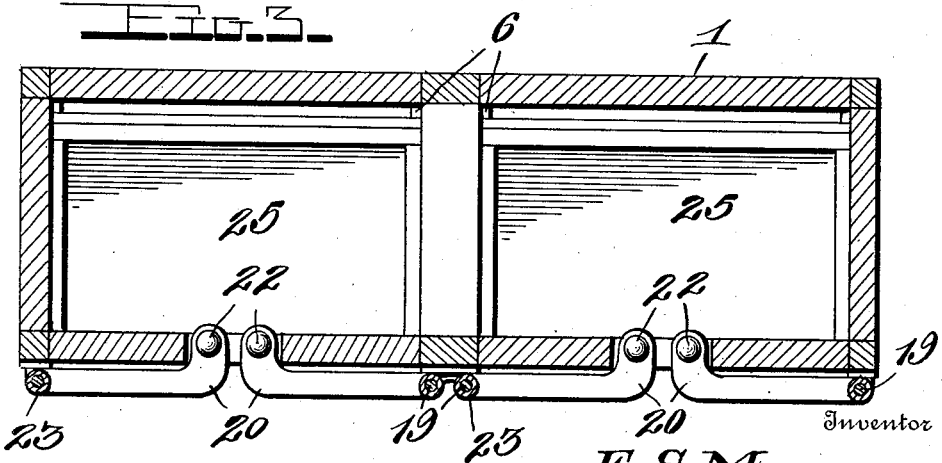

UNITED STATES PATENT OFFICE.

ELIAS S. MOORE, OF MILWAUKEE, WISCONSIN.

INCUBATOR.

1,033,031.  Specification of Letters Patent.  Patented July 16, 1912.

Application filed September 15, 1911. Serial No. 649,493.

*To all whom it may concern:*

Be it known that I, ELIAS S. MOORE, a citizen of the United States, residing at Milwaukee, in the county of Milwaukee and State of Wisconsin, have invented certain new and useful Improvements in Incubators, of which the following is a specification, reference being had to the accompanying drawings.

This invention relates to incubators and particularly to one provided with a series of drawer openings for the reception of egg drawers or frames.

The invention has for its object to produce a device of this character wherein a series of drawer openings are provided for the reception of egg drawers, said drawers being provided with means for turning a number of eggs simultaneously.

A further object of the invention is to provide efficient supporting devices for the drawers when in their extended position.

With the above and other objects in view this invention resides in certain novel features of construction, combination and arrangement of parts, as will be fully hereinafter described and claimed, and illustrated in the accompanying drawings, in which—

Figure 1 is a front elevation of the device, Fig. 2 is a vertical sectional view on the line 2—2 of Fig. 1; Fig. 3 is a horizontal sectional view on the line 3—3 of Fig. 1; Fig. 4 is a top plan view of one of the egg drawers; Fig. 5 is a bottom plan view of one of the egg drawers; Fig. 6 is a top plan view of one of the supporting arms, the ball bearing being removed from the socket.

Referring to the drawings, the numeral 1 designates a rectangular casing, the same being provided with glass panels 2 in the top and sides of said casing. The casing 1 is supported by legs 3, the same being provided with castings 4 whereby the casing may be moved from place to place. The front of the casing 1 is provided with two or more drawer openings 5, said drawer openings being provided with guides 6 and upon which the egg drawers or frames 7 travel when in their open or closed position. The drawers or frames 7 each consist of ends 8 and sides 9.

Shafts 10 are provided and have fixed thereto, in alinement, a plurality of spools 11. The shafts 10 are journaled in suitable openings formed in both ends of the drawer or frame 7. The outer ends of the shafts 10 project slightly beyond the outer faces of the ends 8 and have rigidly secured thereto cranks 12, said cranks being connected by a bar 13. Secured to one of the cranks 12 and preferably the centrally located one is a handle 14 which, when operated, will revolve the shafts 10 simultaneously. A stop 15 is secured to the outer end of the drawer or frame 7 and limits the rotary movement of the shafts 10 and spools 11. The spools 11 are formed from wood and are provided with annular grooves 16. The shafts 10 are arranged parallel with each other, each pair of spools being adapted to support the eggs. The annular grooves 16 should be formed of substantially the same size so as to support eggs which have been graded for incubation purposes, as is customary.

By providing the annular grooves 16 in the spools 11, the eggs are held in longitudinal spaced relation, thus preventing the eggs from contacting with each other at any time which would necessarily retard the chicks in their attempts to liberate themselves by picking the shells. Arranged between the spools are perforated strips 17, which are for the purpose of holding the chicks as they are liberated from the shells. The perforated strips 17 also permit free circulation of the heat to the different egg drawers or frames.

Secured at their upper and lower ends in bearings 18 are vertical rods 19, said rods being preferably secured to the front edges of the sides of the casing 1 and adjacent the drawer openings but in no way interfering with the operation of the drawers or frames 7. Pivotally connected to the rods 19 are pairs of oppositely disposed supporting arms 20, the outer ends of which are curved and provided with seats 21 and in which are mounted ball bearings 22. The supporting arms 20 are each formed at their inner ends with sleeves 23 and through which the rods 19 are passed for pivotally connecting said supports thereto. To the under side of the drawer or frame 7 are secured grooved members 24, the outer ends 8 of the drawers or frames, and their inner ends are secured to the sides 9 of the drawer or frame 7, as clearly shown in Fig. 5 of the drawings, thus supporting the grooved members in converging relation.

When the drawers or frames 7 are in their closed position, the ball bearing 22 upon the supporting arms 20 assumes a position at the extreme outer end of the grooved members 24, but, upon withdrawal of the drawer or frame 7, the ball bearing 22 will travel in the grooved members 24 until the arms 20 have swung outwardly from the front of the casing 1 a sufficient distance to support the drawer or frame 7 when the same is in its open position. Upon closing the drawer or frame 7, the arms can travel with the grooved members 24 until they assume a position flush against the front of the casing 1 and at which time the drawer or casing 7 is in its closed position.

In the drawings I have shown only two pairs of egg drawers or frames 7 and single brooders 25, but it will, of course, be understood that the number of hatching drawers or frames 7 may be varied to suit different conditions and that the sizes of the same may be also varied. By providing the casing 1 with glass panels, the process of incubation may be watched without removing or withdrawing the drawers or frames therefrom and, upon operation of the handle 14, the eggs may be turned from the outside of the casing, thus eliminating the opening and closing of the drawers or trays which would naturally tend to interfere with the interior temperature of the incubator which should be necessarily kept at a certain temperature. The drawers or frames may be easily and quickly drawn into their supported positions upon the arms 20 upon pulling upon the handle 14, thereby permitting the airing of the eggs therein and for removing the chicks when hatched.

Having thus described the invention, I claim:—

In an incubator the combination with a casing having its front wall provided with a series of drawer openings, drawers slidably mounted in said openings and having a pair of forwardly converging members secured to the sides and front sections thereof each of the said converging members being grooved on their under sides to form raceways, vertically supported rods secured to the front wall of the casing at points on opposite sides of the drawer openings, supporting arms pivotally secured to the vertical rods, the inner ends of said arms being curved and each provided with a socket, the said curved portions of said arms disposed beneath the drawers and the converged portions of the raceways, ball bearings mounted in the sockets in the curved portions of the arms, the said balls adapted to engage the raceways and provide a non-frictional support for the drawer.

In testimony whereof I hereunto affix my signature in the presence of two witnesses.

ELIAS S. MOORE.

Witnesses:
WM. BEEM,
JOSE A. SMRZ,